(12) United States Patent
Tarasinski et al.

(10) Patent No.: US 7,287,612 B2
(45) Date of Patent: Oct. 30, 2007

(54) DRIVE SYSTEM FOR VEHICLES

(75) Inventors: Nicolai Tarasinski, Frankenthal (DE); Fritz Glaser, Zweibrücken (DE); Bernd Kneer, Viernheim (DE)

(73) Assignee: Deere & Company, Moline, IL (US)

( * ) Notice: Subject to any disclaimer, the term of this patent is extended or adjusted under 35 U.S.C. 154(b) by 426 days.

(21) Appl. No.: 10/786,985

(22) Filed: Feb. 25, 2004

(65) Prior Publication Data

US 2004/0200648 A1    Oct. 14, 2004

(30) Foreign Application Priority Data

Apr. 11, 2003   (DE)   ................ 103 16 862

(51) Int. Cl.
*B60K 1/00*   (2006.01)
(52) U.S. Cl. .................................... 180/65.7
(58) Field of Classification Search ............... 180/65.1, 180/65.3, 65.4, 65.5, 65.6, 65.7, 233, 247, 180/245, 246, 292, 293, 343, 371, 374
See application file for complete search history.

(56) References Cited

U.S. PATENT DOCUMENTS

| | | | | |
|---|---|---|---|---|
| 5,873,426 A | * | 2/1999 | Tabata et al. | 180/65.7 |
| 5,879,265 A | * | 3/1999 | Bek | 477/1 |
| 5,935,040 A | * | 8/1999 | Tabata et al. | 477/3 |
| 6,005,358 A | * | 12/1999 | Radev | 318/139 |
| 6,427,797 B1 | * | 8/2002 | Chang | 180/247 |
| 6,885,920 B2 | * | 4/2005 | Yakes et al. | 701/22 |

2001/0003109 A1    6/2001   Atsushi

FOREIGN PATENT DOCUMENTS

| | | |
|---|---|---|
| DE | 196 15 742 | 5/1997 |
| DE | 197 23 776 | 12/1997 |
| DE | 197 23 776 A 1 | 12/1997 |
| DE | 197 24 681 A 1 | 2/1998 |
| DE | 199 19 454 | 11/2000 |
| DE | 199 54 544 | 8/2001 |
| DE | 101 26 348 | 1/2002 |
| EP | 0 812 720 B1 | 6/1997 |
| EP | 1 077 150 | 2/2001 |
| GB | 2 346 124 | 8/2000 |

OTHER PUBLICATIONS

Patent Abstracts of Japan, Mar. 5, 2001.

* cited by examiner

*Primary Examiner*—J. Allen Shriver
*Assistant Examiner*—Bridget Avery

(57) ABSTRACT

A drive system for vehicles, especially for commercial vehicles such as agricultural or industrial tractors, the vehicle having at least one first wheel that is driven by an associated axle or single-wheel drive motor and at least one second wheel, in the drive train of which a gearbox that can be shifted between at least two speed transmission steps is arranged. To avoid vehicle speed drops while shifting the change-speed gearbox and to avoid interfering shifting jolts, it is suggested to provide a device for the detection of a shift command and a control unit, which in the presence of a shift command automatically applies a greater load at least on the drive motor driving the first wheel, controls the shifting operation of the change-speed gearbox of the second wheel and then lowers the load of the drive motor driving the first wheel.

10 Claims, 2 Drawing Sheets

US 7,287,612 B2

DRIVE SYSTEM FOR VEHICLES

FIELD OF THE INVENTION

The present invention relates generally to a drive system for vehicles, especially for commercial vehicles such as agricultural or industrial tractors, comprising at least one first wheel that is driven by an associated axle or single-wheel drive motor and at least one second wheel, in the drive train of which a gearbox that can be switched between two speed transmission or multiplication steps is arranged.

BACKGROUND OF THE INVENTION

For matching the drive power to different driving requirements, vehicle drive systems have been suggested in which a separate drive is assigned to each vehicle axle or each wheel of the vehicle. EP-A-0 812 720 for example describes a vehicle with a drive system of the aforementioned kind. A generator driven by an internal combustion engine supplies the electric energy for electric motors. The wheels of the front axle of the vehicle are driven by an associated electric motor, while the rear wheels are driven electro-mechanically in that the internal combustion engine drives a drive shaft that is allocated to the rear axle of the vehicle. Each wheel of the rear axle is assigned a summing gear and an electric motor. The summing gear combines the drive power of the drive shaft and the corresponding electric motor and passes it on to the appropriate rear wheel. A change-speed gearbox that can be shifted between at least two transmission ratios is arranged between the internal combustion engine and the two summing gears. When switching the change-speed gearbox, the tractive power to the rear wheels is interrupted. This can lead to a slowing of the vehicle and express itself in an unpleasant manner for the operator in the form of a shifting jolt. It has been found that even when using a change-speed gearbox that can be shifted under load the aforementioned disadvantages cannot be avoided.

SUMMARY OF THE INVENTION

In view of the foregoing, it is an object of the invention to provide a drive system of the aforementioned kind such that the problems described above are overcome.

Another object of the invention is the provision of a drive system of the aforementioned kind wherein vehicle speed decreases and interfering shifting jolts are avoided when shifting a change-speed gearbox.

In general, a drive system for a vehicle, especially for a commercial vehicle such as an agricultural or industrial tractor, the vehicle having at least one first wheel that is driven by an associated axle or single-wheel drive motor and at least one second wheel, in the drive train of which a gearbox that can be shifted between at least two speed transmission steps is arranged. To avoid vehicle speed drops while shifting the change-speed gearbox and to avoid interfering shifting jolts, it is suggested to provide a device for the detection of a shift command and a control unit, which in the presence of a shift command automatically applies a greater load at least on the drive motor driving the first wheel, controls the shifting operation of the change-speed gearbox of the second wheel and then lowers the load of the drive motor driving the first wheel.

The drive system comprises at least a first wheel that is driven by an associated axle or single-wheel drive motor and at least one second wheel, in the drive train of which a gearbox that can be shifted between at least two speed transmission stages is arranged. Pursuant to the invention a device for the detection of a shift command as well as a control unit are provided. The control unit reacts to a shift command by automatically applying a greater load at least on the drive motor driving the first wheel so that the first wheel yields greater torque. In a time-related connection the shift of the change-speed gearbox of the second wheel is controlled. In the final phase of the shifting process, the load of the drive motor that drives the first wheel is lowered again. Said motor can then generate for example again its original torque. With this shifting method no significant interruption or decrease in the tractive force occurs during the shifting process, which due to the tractive resistance could lead to the braking and deceleration of the vehicle. Rather, the decrease in power on the wheel that is to be shifted is compensated by a corresponding increase in tractive force on the wheel that is not shifted and continues to drive. The vehicle thus maintains its speed and unpleasant shifting jolts are avoided or at least weakened considerably.

This shifting and drive strategy pursuant to the invention can be applied in various vehicle drive concepts in a beneficial manner. The inventive drive concept for example can be applied in a vehicle where the rear wheels are driven in the conventional manner by an internal combustion engine and a mechanical gearbox that can be switched between various transmission ratios or a hydrostatic-mechanical gearbox. The front wheels by contrast are driven by separate drive motors, wherein a drive motor can drive the two wheels of the front axle jointly (axle drive motor) or each front wheel comprises a separate drive motor (single-wheel drive motor). The drive motors preferably are electric machines, especially electric motors. When shifting a gearbox, the drive motor is or the drive motors are driven with increased power so that they compensate the interruption or reduction in tractive power occurring on the rear wheels, and the vehicle can travel with unchanged speed.

In another beneficial drive concept, both the rear wheels and the front wheels are driven by axle drive motors or by single-wheel drive motors. With regard to the arrangement of shiftable gearboxes, several possibilities arise. Change-speed gearboxes can be arranged between drive motors of the front axle and the associated front wheels or between drive motors of the rear axle and the associated rear wheels or both between the drive motors of the front axle and the associated front wheels and also between the drive motors of the rear axle and the associated rear wheels. When shifting the change-speed gearbox or the change-speed gearboxes of an axle, the drive motor or the drive motors of the other axle will experience a greater load, i.e. will be operated at higher power consumption.

If to each of the four wheels of a vehicle a separate drive motor with a subsequent shiftable gearbox is assigned, with the presence of a shift command initially the change-speed gearboxes of a first axle can be shifted between two transmission steps and during the shifting operation the drive motors of the second axle can be operated with increased drive power. Subsequently the change-speed gearboxes of the second axle are shifted and during the shifting operation the drive motors of the first axle are operated with increased power.

The shifting operation can beneficially be conducted as follows: Initially the torque that is required for driving the vehicle is split among all vehicle wheels. When for example during acceleration or deceleration of the vehicle its speed approaches a value that necessitates a shift into a higher or lower gear, the operator or an automatic shifting control device issues a shift command to the control device. In preparation of the shifting operation of the vehicle wheels of a first vehicle axle, the control device initiates a shift of the required torque to the vehicle wheels of the second vehicle axle by temporarily applying a greater load on the drive motors of the second vehicle axle, while the drive systems that are affected by the shifting operation become torque-free so that the change-speed gearbox can be shifted. Upon a completed shift, the necessary torque is shifted to the vehicle wheels that have already been shifted so that the wheels that have not been shifted yet become torque-free and can be shifted. After shifting the change-speed gearboxes of all four wheels, the torque that is required for driving the vehicle is again split among all four wheels.

In a vehicle with separate drive motors and change-speed gearboxes for each wheel, a control device can also be beneficial, with which initially the shiftable gearboxes of two first diagonally opposing wheels are shifted simultaneously with the existence of a shift command, while the drive motors of the two other second wheels experience a greater load and are shifted simultaneously by the immediately following gearboxes that are associated with the two diagonally opposing wheels, while the drive motors of the two first wheels experience a greater load. In general, however, an axle-specific shifting operation is preferable for driving stability reasons.

With farming tractors, the change-speed gearbox for example can comprise a first gear range that permits driving speeds of e.g. up to 27 km/h and is used primarily during working operations. A second gear range permits driving speeds e.g. up to 65 km/h and is used when driving on roads. With such large jumps in gear ratios (1:2.4) normally interfering shifting jolts occur if during acceleration or deceleration of the vehicle a gear or range shift is performed by the operator or by an automatic gear change system. The shifting jolts are unpleasant especially with automatic transmissions because here they occur unexpectedly. These shifting jolts can be avoided by using a drive system pursuant to the invention.

Powershift transmissions can be used as change-speed gearboxes. It is also advantageous to use a standard transmission in the drive train of which a clutch is arranged for interrupting the flow of power.

A beneficial embodiment of the invention that should be particularly emphasized provides for electric machines or hydraulic motors to be installed as the axle or single-wheel drive motors. Electric or hydraulic single-wheel drive motors are described in the following also as wheel motors. Especially electric machines offer the advantage that they can be heavily overloaded for a short time without being damaged. The permissible consumed power and/or the maximum torque supplied can for example be increased briefly by a factor of 2. It is thus possible to perform the inventive shifting operation even when a maximum drive power is demanded from the vehicle. Even during such operations, a short increase in the drive power of the respectively affected electric machine is permissible. For example during a shifting process on one axle in a vehicle with four single-wheel drives the wheel motors of the other axle can assume, in addition to their existing tractive power, a portion of the tractive power or even the entire tractive power of the currently shifted axle (which can be free from drive power during the shifting operation).

The energy source for the electric machines is preferably an electric energy storage unit that can be mounted on the vehicle and/or a generator that is driven by an internal combustion engine.

Preferably the electric machine and its selection are designed such that the electric machine can be operated both as an electric motor, which drives the associated wheel, or also as a generator, which slows the associated wheel down.

When using a generator that supplies the electric energy for the electric machines, preferably a converter and an intermediate circuit are arranged downstream from it, permitting also a motor-driven operation of the generator. This way it is possible to support the braking operation of the vehicle electrically by operating the axle or single-wheel drive motors with the generator. The electric energy they create is fed to the generator, which now functions like an electric motor and increases the speed of the internal combustion engine and thus supplies it with energy that decelerates the vehicle as braking energy ("electric brake").

As a supplemental or alternative "electric brake" also braking resistance systems can be used, which destroy the electric energy created by the electric machines.

A preferred embodiment of the invention provides that the shiftable gearbox comprises a planetary gearbox, particularly a powershift transmission or a standard transmission. It is also beneficial to arrange at least one speed-reducing final drive transmission, especially a planetary transmission, downstream from the axle or the single-wheel drive motor. This way the drive motors can be operated in favorable speed ranges.

For a compact design it is advantageous to arrange the single-wheel drive motors within the wheel rim of the associated wheel. Likewise, a change-speed gearbox that is arranged upstream from the drive motor and/or a wheel brake and/or a planetary gear-reducing step that is arranged downstream from the drive motor can be arranged within the wheel rim or in the vicinity of the wheel rims.

To acquaint persons skilled in the art most closely related to the present invention, one preferred embodiment of the invention that illustrates the best mode now contemplated for putting the invention into practice is described herein by and with reference to, the annexed drawings that form a part of the specification. The exemplary embodiment is described in detail without attempting to show all of the various forms and modifications in which the invention might be embodied. As such, the embodiment shown and described herein is illustrative, and as will become apparent to those skilled in the art, can be modified in numerous ways within the spirit and scope of the invention—the invention being measured by the appended claims and not by the details of the specification.

BRIEF DESCRIPTION OF THE DRAWINGS

For a complete understanding of the objects, techniques, and structure of the invention reference should be made to the following detailed description and accompanying drawings, wherein.

DESCRIPTION OF THE PREFERRED EMBODIMENT

Figure 1:
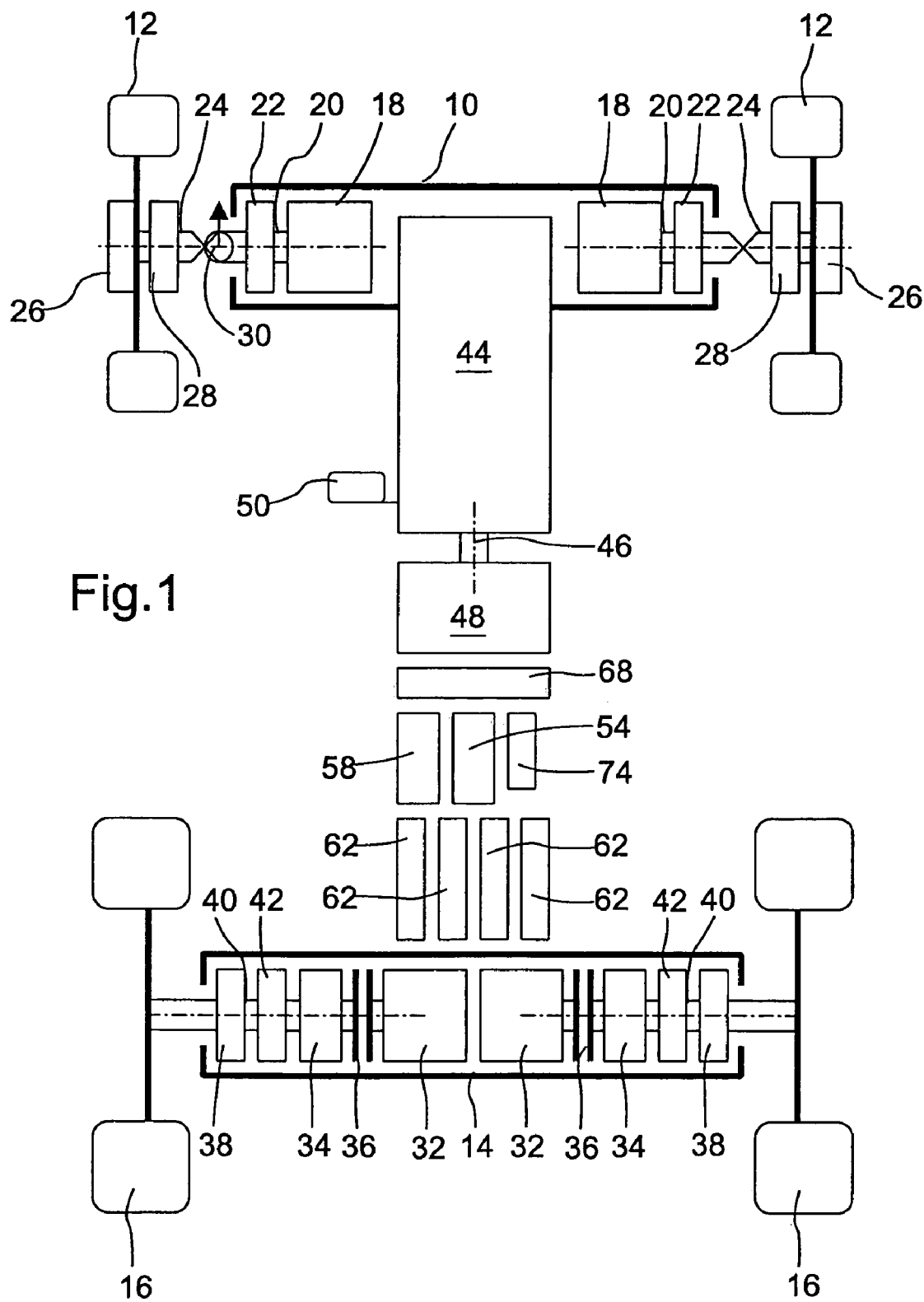
FIG. 1 is a diagrammatic view of a vehicle drive system.

In the figures equivalent parts and components were assigned the same reference numbers. The vehicle drive system shown in FIG. 1 is provided for an agricultural tractor and comprises a front axle 10 with front wheels 12 and a rear axle 14 with rear wheels 16.

Each wheel 12 of the front axle 10 is driven by an associated electric motor 18. The output shaft 20 of each electric motor 18 is connected to the input shaft of a planetary gear-reducing transmission 22, which provides its output power to the front wheel 12 via a drive shaft 24, which comprises a cardan joint, as well as a planetary gear-reducing step 26. A mechanically actuated wheel brake 28 is integrated into the drive shaft 24. The cardan joints enable the steering of the front wheels 12. A steering-angle sensor 30 detects the steering angle of the front wheels 12.

Each wheel 16 of the rear axle 14 is driven by an associated electric motor 32. Between the electric motor 32 and a change-speed gearbox 34 that can be shifted between two transmission ratios a clutch 36 is arranged. The output speed of the change-speed gearbox 34 is further reduced in a planetary gear-reducing step 38 and supplied to the associated rear wheel 16. Here as well a mechanically actuated wheel brake 42 is integrated into the drive shaft 40, which runs between the change-speed gearbox 34 and the planetary gear-reducing step 38.

Via a drive shaft 46, an internal combustion engine 44 drives a generator 48, which supplies the electric power for the electric motors 18, 32. The vehicle speed is detected by a radar sensor 50.

Figure 2:
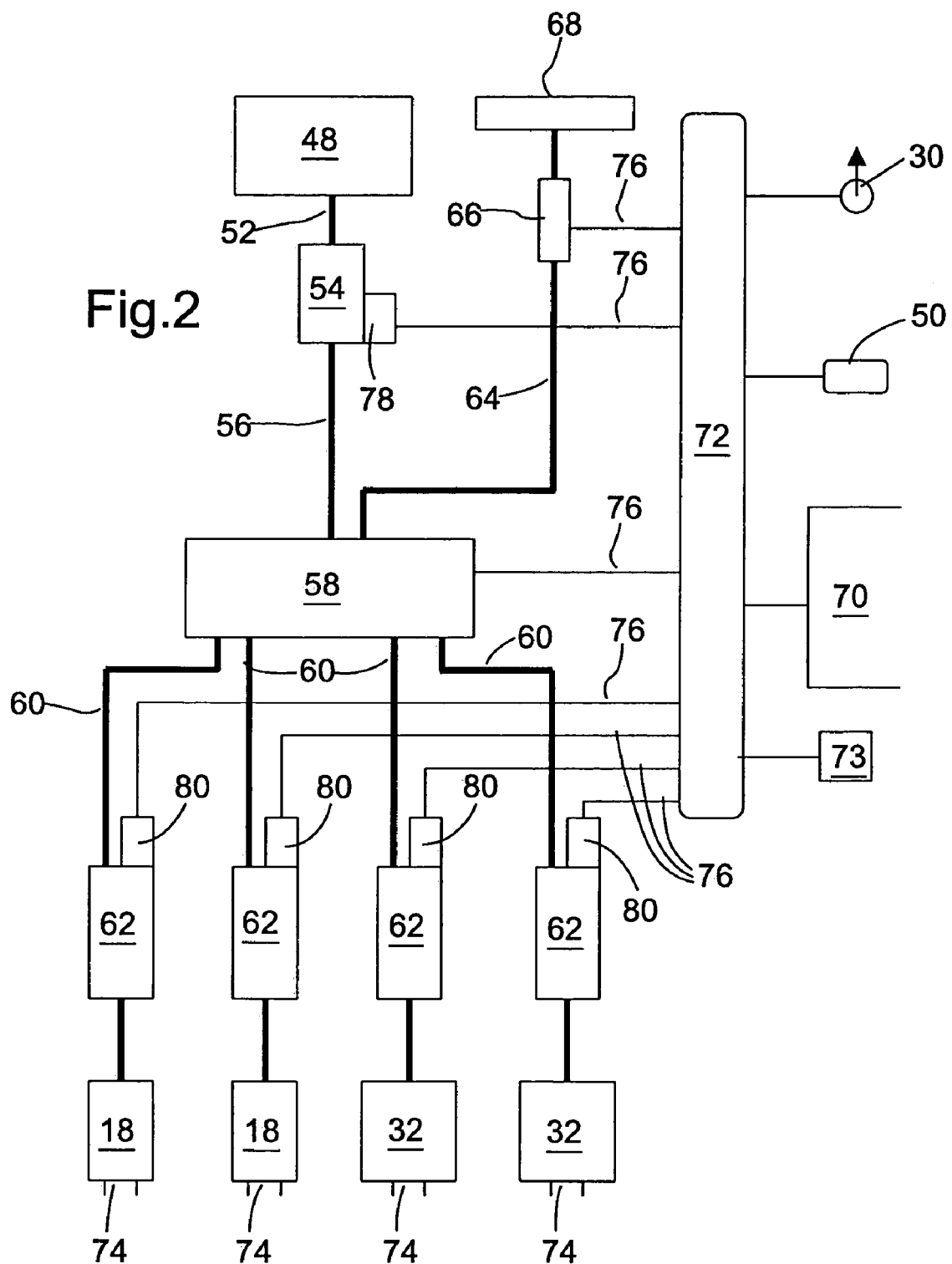
FIG. 2 is shifting arrangement for the electric components of a drive system pursuant to FIG. 1.

As can be seen in FIG. 2, the generator 48 is connected with a frequency converter 54, which forms a generator intermediate circuit, via a cable 52. A direct current intermediate circuit 58 with an energy storage unit that is not shown in detail is arranged downstream from the frequency converter 54. The direct current intermediate circuit 58 supplies via additional cables 60 the frequency converters 62, which are assigned to the individual electric motors 18, 32 and supply them with electric energy. The direct current intermediate circuit 58 moreover is connected by means of another cable 64 with a braking resistance disk 66, to which one or more cooled braking resistance units 68 are connected.

An electric control unit 70, designed as a micro-controller, is provided, which is connected to a BUS system 72. Additionally the steering-angle sensor 30, the radar sensor 50 and a shift detection device 73 are connected to the BUS system 72 so that the signals can be transmitted to the control unit 70 and be processed there. The shift detection device 73 can also be a switch, which is not shown and could be actuated by the operator, or a control unit, which generates a shift signal automatically based on the driving conditions.

A plurality of additional electric sensors and input devices (not shown) can be connected to the BUS system 72. For example the electric signals supplied by speed sensors 74 detecting the speed of the electric motors 18, 32 as well as by speed sensors detecting the wheel speeds, by temperature sensors recording the temperature of the electric motors 18, 32, by position sensors detecting the gas pedal position and the brake pedal position, and by gear shifting sensors detecting the shifting signals for the planetary shift transmissions 34 can be fed into the BUS system 72 so that these signals as well can be recorded by the control unit 70 and processed.

Moreover also an input device (not shown) can be provided, with which the control unit can be programmed and which enables the input of vehicle-specific data such as wheel base, track width, diameters of the front and rear wheels, gear ratios of the transmissions, maximum permissible speeds for transmissions and electric motors and the like.

The BUS system is connected via a BUS system cable 76 with a micro-controller 78 for the generator intermediate circuit 54, with the direct current intermediate circuit 58, with the micro-controllers 80 for the frequency converters 62 of the electric motors 18, 32 and with the braking resistance disk 66 so that these can be selected by the control unit 70. By means of the BUS system cables 76, the micro-controllers 78, 80 and the direct current intermediate circuit 58 feed electric data with respect to current, potential and frequency to the control unit, which enables the calculation of torque, power and the like. The control unit 70 also supplies electric control signals to the clutches 36 via the BUS system 72, which is not depicted in more detail.

The drive system allows a vehicle in normal operation to be driven either by all four electric motors 18, 32 that are supplied by the generator with electric energy or solely by the two electric motors 32 of the rear axle 14. If the vehicle is accelerated or decelerated such that a gear change is required on the change-speed gearboxes 34 so as not to operate the electric motors with too high or too low a speed, then the power of the electric motors 32 of the rear axle 14 is reduced and the clutches 36 are opened with electric signals. Now a switch of the planetary switching transmission 34 can occur. Subsequently the clutches are again closed by corresponding electric control signals, and the electric power of the electric motors 32 of the rear axle 14 is again increased.

In order to avoid an interruption in the tractive force during this shifting process, the two electric motors 18 of the front axle 10 are selected simultaneously for the purpose of generating torque on the front wheels 12, which will balance the drop in tractive power occurring on the rear wheels 16. The control unit 70 hereby can synchronize the selection of the electric motors 18, 32 such that when the power of the electric motors 32 of the rear axle 16 is reduced the power of the electric motors 18 of the front axle 12 is accordingly increasingly. After shifting the planetary shifting transmission 34 and closing the clutch 36, the power of the electric motors 32 of the rear axle 14 is increased again and the power of the electric motors 12 of the front axle 10 is lowered in the same degree.

In the case of a tractor with good ballast balance, about 30% of the available tractive power is transmitted via the front wheels (15% per front wheel) and about 70% via the rear wheels (35% per rear wheel) for nominal tractive power. If the power of the tractor is not utilized fully for towing because e.g. the maximum possible tractive power is not being run, the tractive power remains split between the front wheels and the rear wheels roughly at 30% to 70%. Accordingly also the lower overall drive power of the electric motors is divided between front and back. A subsequent adjustment of the torque on the individual wheels occurs in such a way that, to the extent possible, roughly equal slip values are created for all 4 wheels. This way different wheel loads and different friction coefficients between the tires and the ground are taken into consideration optimally. Each wheel hereby maintains the greatest possible lateral stability force. This improves driving stability considerably and hence driving safety. The vehicle does not veer from the desired path.

To find out the exact slippage, a radar sensor 50 can be used to detect the actual travel speed v. The slippage s can be calculated from the wheel circumferential speed u and the actual travel speed v:

$$s = (u-v)/u.$$

In practice, however, it is not absolutely necessary to know the actual and exact slippage value s for each wheel. When the speeds of the wheels while driving straight ahead and driving in curves correspond to the rolling condition according to Ackermann, equal slippage exists on all wheels. According to Ackermann's condition, the wheels of a vehicle travel on circular tracks around a common center. From the vehicle geometry we know the wheel base, the track width of the axles and the scrub radius. According to Ackermann, when traveling in curves the desired speeds and desired rpm values of the individual wheels can be exactly calculated with the electronic control unit 70 based on the curve paths, which can be calculated, of the individual wheels. The current steering angle that is required is determined with the steering-angle sensor 30. When traveling straight ahead, the wheels should have the same circumferential speed. This likewise guarantees the same slippage on all wheels.

Within the respective gears of the change-speed gearboxes 22, 34, the travel speed is adjusted via the speeds of the electric motors 18, 32. The necessary torque is adjusted such that no distortion arises between the individual wheels 12, 16. This has been accomplished when all wheels 12, 16 have the same slippage. In a driven wheel 12, 16 on which greater slippage is detected than the average of all 4 wheels, the control unit 70 lowers the driving torque. When the slippage of a driven wheel 12, 16 is lower than the average of all 4 wheels, the driving torque is increased. This way all 4 wheels arrive at the same slippage. This method also enables an unproblematic driving operation when the ground is such that different coefficients of adhesion or coefficients of drive power result between the tires and the ground. This way it is possible to pull all wheels evenly in accordance with their wheel load and the ground friction coefficients and that all wheels end up with the greatest possible lateral stability force. A wheel with high slippage loses a large portion of the possible lateral stability force. In extreme cases too great a slippage of individual wheels can lead to a skidding of the vehicle from the track; it is therefore important to control the even and low slippage of all wheels. This task of monitoring the slip values of the individual wheels is performed by the control unit 70, which is part of the drive control system of the vehicle. With slight braking that occurs only by means of the electric motors 18, 32 of the individual wheel drives the braking torque values are also adjusted in an analog fashion to the same negative slippage.

Tractors travel on solid roads and on soft agricultural ground. Accordingly, this results in different tractive forces that are to be transmitted and thus in different torque values on the individual wheels 12, 16. The torque can be determined indirectly. The driver specifies a desired speed. The vehicle motor 44 must overcome road resistance and the additionally desired drive power (e.g. on a power take-off shaft that is not shown). This results in the drive power required by the vehicle motor 44. The drive power values of the individual electric motors 18, 32 and/or their torque values are divided in accordance with the specified speed. 30% of the drive power for the front axle 10 means 15% for one wheel motor 18 of the front axle 10. Accordingly 70% of the drive power are divided for the rear axle 14, meaning 35% for one wheel motor 32 of the rear axle 14. The electric motor 18, 32 are also referred to as wheel motors here.

If the road enables good transmission of the tractive force between the tires and the ground, slippage between tires and ground should remain below about 5%. However, with every tractive power generated by the tractor a certain amount of slippage arises between the tires and the ground. The control unit 70 monitors the individual wheel speeds either by means of wheel speed sensors 74 on the wheel motors 18, 32 or it determines them based on the electric data of the electric motors 18, 32. It limits deviations in the slip values of the individual wheels 12, 16 to a permissible amount. Any slip value should not deviate more than e.g. a maximum of 5% from its desired value. A desired slip value of 5% should therefore be within the limits of 4.75% and 5.25%. Splitting of the drive power and selection of the wheel motors 18, 32 are performed by the electronic control unit 70. It forwards the necessary information with regard to the availability of current flow, potential and frequency to the frequency converters 62 that are assigned to the wheel motors 18, 32 for the purpose of fulfilling the required slippage conditions.

With a steering angle of the steering axle 10, the required drive rpm values of the wheels 12, 16 can be established based on the Ackermann condition. When performing a calculation with the Ackermann condition, it can be predicted based on the geometric rolling circumference values on the individual circular tracks what speed rpm values as a function of the steering angle are required. When traveling in curves the front wheels 12 drive on a larger circle than the rear wheels 16 and must accordingly be driven with an adjusted higher speed than when traveling straight ahead. The Ackermann condition provides the necessary driving rpm value for each wheel 12, 16.

If due to the quality of the road the tractive force between the tires and the ground is no longer transmitted well, the slip value between tires and ground can exceed a value of for example 5%. The control unit 70 assumes the task of limiting deviations in the slip values of the individual wheels 12, 16 to a permissible amount.

The required wheel torque is obtained as a product from the tractive power of each wheel and its rolling radius. By means of the adjusted transmission ratios, the torque of each electric motor 18, 32 can be determined. Torque and required wheel speed result in the drive power of each wheel motor 18, 32.

The desired travel speed results in the wheel speed required for it. From the driving and acceleration resistance the torque values of the electric motors 18, 32 can be calculated. Torque and speed, respectively, result in the required drive power values. The overall required drive power is split among the 4 wheels in accordance with the specified power distribution of 15% for each front wheel and 35% for each rear wheel. Subsequent adjustment of the torque values for each wheel drive occurs in accordance with the specification of same slippage values for all wheels 12, 16, i.e. subsequent adjustment of the wheel speeds and/or speeds of the electric motors 18, 32 in accordance with the Ackermann condition. The control unit 70 assumes this function. The wheel load distribution can change drastically in some applications, e.g. with a fully loaded front-end loader shovel and when backing up a steep slope. In this case, a relatively higher power is demanded from the electric motors 18 of the front wheels 12. To this end, generally a brief overload of these electric motors 18 due to a higher release power can be permitted to the extent that the driver desires it. Due to the subsequent adjustment to the same slippage on all wheels 12, 16 no distortion in the drive occurs and the greatest possible lateral stability force is maintained. A high lateral stability force is important in the case of slippery ground conditions and locations on slopes to prevent the vehicle from skidding off the travel path.

A wheel is torque-free when no tension and no current is generated by the converter 62 and forwarded to the wheel motor 18, 32 and when the wheel 12, 16 is not used to drive the electric motor 18, 32 (generator operation), i.e. when electric power is neither fed to the electric motor 18, 32 nor obtained from it. A relatively low torque due to frictional forces caused by bearing friction and gear friction losses, however, can still be present.

To protect the wheel drives from overload, temperature sensors are provided in the electric components (electric motors). They feed temperature signals to the control unit 70. In case of impermissible heating of the electric motors 18, 32, the applied tension and current is lowered to a permissible amount with the help of the control unit 70. Generally these current and tension values correspond to those for a maximum permissible permanent load. Thus an impermissible increase in temperature normally leads to a decrease in the vehicle's travel speed, however even with a particularly high overload it generally does not lead to a stopping of the vehicle. The entire behavior of the vehicle is designed such that the highest required tractive force values in accordance with the state of the art are also achieved with the drive system pursuant to the invention.

Even if, when traveling downhill at the highest speed, the operator initiates further acceleration by actuating the gas pedal, the control unit 70 automatically lowers the drive power down to an automatic braking operation via the four electric motors 18, 32, which then operate as generators. The excess power is supplied to the generator 48, then operating as a motor, for driving the internal combustion engine 44 until it has reached its maximum permissible speed. Further excess power can be destroyed in braking resistance units 68 and/or be stored in the vehicle battery, if necessary. This prevents an impermissible overspeed of the individual wheel motors 18, 32 effectively. Moreover the operator can be made aware of overspeed situations with suitable acoustic or visual warning signals.

Thus it can be seen that the objects of the invention have been satisfied by the structure presented above. While in accordance with the patent statutes, only the best mode and preferred embodiment of the invention has been presented and described in detail, it is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The embodiments of the invention in wich an exclusive property of privilege is claimed are defined as follows:

1. A drive system for a vehicle, the vehicle having at least one first wheel that is driven by a first electric machine and at least one second wheel driven by a second electric machine, in a drive train of which a shiftable transmission that can be shifted between at least two speed transmission steps is arranged between the second electric machine and the second wheel, comprising:
    a device for the detection of a shift command; and,
    a control unit, which in the presence of a shift command automatically applies a greater load on the electric machine driving the first wheel, controls the shifting operation of the shiftable transmission of the second wheel and then lowers the load of the electric machine driving the first wheel, wherein a generator that is driven by an internal combustion engine serves as an energy source for the electric machines, the electric machines being designed such that the electric machines can be operated both as an electric motors driving the associated wheels and as generators braking the wheels, and wherein at least one converter and an intermediate circuit are arranged downstream from the generator in such a way that the generator can be driven electrically by the power released by the electric machine operating as a generator in the electric braking operation and thus operate as an electric motor.

2. A drive system according to claim 1 wherein at least two vehicle axles with at least two wheels, respectively, are provided, and wherein the wheels of at least one first axle are driven by an electric machine and the wheels of at least one second axle are driven through at least one shiftable transmission by one of a vehicle drive train, an axle electric machine or single-wheel electric machines.

3. A drive system according to claim 1, wherein at least one first wheel through a first shiftable transmission is driven by a first single-wheel electric machine and at least one second wheel through a second shiftable transmission is driven by a second single-wheel electric machine, and that the control device in the presence of a shift command initially performs a shift of the first transmission while raising the load of the second single-wheel electric machine and subsequently performs a shift of the second transmission while raising the load of the first single-wheel electric machine.

4. A drive system according to claim 1, wherein a clutch is arranged in a drive train comprising a change-speed gearbox.

5. A drive system according to claim 1 wherein at least one electric energy storage unit that can be mounted on the vehicle serves as an energy source for the electric machine.

6. A drive system according to claim 1, wherein the shiftable transmission comprises one of a planetary gearbox or a standard transmission.

7. A drive system according to claim 1, wherein at least one speed-reducing final drive transmission is arranged downstream from one of the electric machines.

8. A drive system according to claim 1, wherein the electric machine is arranged within a wheel rim.

9. A drive system according to claim 1, wherein the shiftable transmission is arranged within a wheel rim.

10. A drive system according to claim 7, wherein the final drive transmission is arranged within a wheel rim.

* * * * *